US010708715B2

(12) United States Patent
Silva (10) Patent No.: US 10,708,715 B2
(45) Date of Patent: Jul. 7, 2020

(54) METHOD AND SYSTEM FOR 3-D LOCATION OF MOBILE DEVICES

(71) Applicant: Christopher Anthony Silva, Fair Haven, NJ (US)

(72) Inventor: Christopher Anthony Silva, Fair Haven, NJ (US)

( * ) Notice: Subject to any disclaimer, the term of this patent is extended or adjusted under 35 U.S.C. 154(b) by 0 days.

(21) Appl. No.: 15/784,338

(22) Filed: Oct. 16, 2017

(65) Prior Publication Data

US 2019/0116457 A1    Apr. 18, 2019

(51) Int. Cl.
*H04W 4/02* (2018.01)
*G01S 5/02* (2010.01)
*G01S 5/00* (2006.01)

(52) U.S. Cl.
CPC .......... *H04W 4/025* (2013.01); *G01S 5/0072* (2013.01); *G01S 5/0263* (2013.01); *G01S 5/0289* (2013.01); *H04W 4/023* (2013.01)

(58) Field of Classification Search
CPC ....... H04W 4/02; H04W 4/021; H04W 4/023; H04W 4/025; H04W 4/029; H04W 4/33; H04W 4/38; H04W 4/14; H04W 4/043; H04W 4/18; H04W 64/00; H04W 16/00; H04W 16/18; H04W 16/225; H04W 12/02; H04W 4/185; H04W 64/003; H04W 64/006; H04W 40/244; H04W 40/246; H04W 12/00503; G01S 5/02; G01S 5/00; G01S 5/0263; G01S 5/0289;
(Continued)

(56) References Cited

U.S. PATENT DOCUMENTS

8,005,486 B2 *  8/2011 Pahlavan et al. .......... 455/456.1
8,149,162 B1 *  4/2012 Pauls .......................... 455/456.5
(Continued)

*Primary Examiner* — Meless N Zewdu
(74) *Attorney, Agent, or Firm* — Porzio Bromberg & Newman P.C.

(57) ABSTRACT

A system and method for 3-Dimensional location of a mobile device in which the mobile device is enhanced with an emulation of a wireless communications beacon, in addition to global positioning system (GPS) location capabilities. To pinpoint the location of the mobile device within the general location, a plurality of devices within a wireless communication range of the mobile device ping each other with the emulated wireless communications beacon. The plurality of mobile devices determined within the wireless communication range can send information to one another in order to supply for example their own unprecise GPS coordinates, the relative distance to any mobile device that responded to the virtual beacon ping of the mobile device and a mobile device identification or alias. The information received at each mobile device can be provided from each mobile device to a central location. At the central location triangulation, quadrilatration, n-lateration and the like can be performed in 3 dimensions using four or more of the mobile devices which provide information about themselves and the three or more others. The central location can utilize topographical maps and data analysis to determine a ground level. Precise locations can be sent to the mobile device or used by aggregating software that could find anonymous, or specific in the case of law enforcement and the such, beneficial.

12 Claims, 8 Drawing Sheets

(58) Field of Classification Search
CPC ........ G01S 5/0072; G01S 19/48; G01S 19/39;
G01S 5/0018; G01S 5/0019; G01S
5/0027; G01S 19/49; G01S 5/0231; G01S
5/0284
See application file for complete search history.

(56) References Cited

U.S. PATENT DOCUMENTS

| | | | |
|---|---|---|---|
| 9,538,499 B2 | 1/2017 | Smith et al. | |
| 9,759,800 B2 | 9/2017 | Potkonjak | |
| 9,769,601 B2 | 9/2017 | Zelinka | |
| 9,769,625 B2 | 9/2017 | Tenant De La Tour et al. | |
| 9,980,246 B2 * | 5/2018 | Pattabiraman et al. | H04W 64/006 |
| 2002/0155845 A1 * | 10/2002 | Martorana | 455/456 |
| 2004/0033808 A1 * | 2/2004 | Rorabaugh | 455/456.1 |
| 2009/0005069 A1 * | 1/2009 | McAlexander | 455/456.1 |
| 2011/0151955 A1 * | 6/2011 | Nave | 463/2 |
| 2012/0200419 A1 * | 8/2012 | Nylund | 340/686.1 |
| 2012/0236110 A1 * | 9/2012 | Ogle et al. | 348/14.09 |
| 2014/0155098 A1 * | 6/2014 | Markham et al. | H04W 4/02 |
| 2014/0219118 A1 * | 8/2014 | Middleton et al. | H04W 4/023 |
| 2014/0370959 A1 * | 12/2014 | Yacenda | G07F 17/3241 |
| 2015/0084813 A1 * | 3/2015 | Braiman | 342/357.51 |
| 2016/0323803 A1 * | 11/2016 | Friday et al. | H04W 40/244 |
| 2017/0094462 A1 * | 3/2017 | Rekimoto | H04W 4/021 |
| 2017/0193686 A1 * | 7/2017 | Mullins | G06T 15/205 |
| 2017/0256097 A1 * | 9/2017 | Finn et al. | G06T 19/006 |
| 2017/0295480 A1 * | 10/2017 | Krishnan et al. | H04W 4/22 |
| 2018/0292506 A1 * | 10/2018 | Bjorkengren | G01S 3/08083 |
| 2018/0295598 A1 * | 10/2018 | Donnellan et al. | H04W 64/00 |
| 2018/0310272 A1 * | 10/2018 | Younis | H04W 64/00 |

* cited by examiner

METHOD AND SYSTEM FOR 3-D LOCATION OF MOBILE DEVICES

FIELD OF THE INVENTION

The present invention relates to a method and system for determining the location of a mobile device in three dimensions (3-D).

DESCRIPTION OF RELATED ART

Conventional methods exist to locate a mobile device. U.S. Pat. No. 9,538,499 describes that a number of different methods, technologies, solutions, and/or techniques are currently available for determining the location of mobile device. Such solutions include, global positioning system (GPS) based solutions, assisted GPS (A-GPS) solutions, and cell-based positioning solutions such as cell of origin (COO), time of arrival (TOA), observed time difference of arrival (OTDOA), advanced forward link trilateration (AFLT), and angle of arrival (AOA). In various embodiments, such solutions may be implemented in conjunction with one or more wireless communication technologies and/or networks, including wireless wide area networks (WWANs), wireless local area networks (WLANs), wireless personal area networks (WPANs), and other similar networks or technologies. These methods provide a location in the X and Y plane.

The GPS service used by mobile devices has an accuracy of within approximately 30 feet from provided latitude and longitude coordinates. Conventional mobile device towers utilize triangulation to determine more precise X,Y locations of mobile devices using them for public safety purposes, but this information is not available to the end user. To accomplish the precision, the mobile device must send and receive a signal from two towers. The towers each have an array of antennas, or an antenna that is able to determine the direction by separating signals into distinct quadrants from the physical direction from which they were received. The rough direction information from each tower combined with the time it takes to send and receive a signal from the device from each tower is used to pinpoint the location of the device. Bluetooth beacons are fixed devices within buildings that perform a similar operation to tower triangulation, but with Bluetooth as the underlying technology to communicate.

U.S. Pat. No. 9,759,800 describes techniques for determining locations of a plurality of communication devices in a network. A location discovery infrastructure (LDI) for estimating locations of one or more of a plurality of communication nodes is described which may comprise one or more of determining a plurality of locations in the terrain to place a corresponding plurality of beacon nodes, determining a plurality of beacon node groups for the placed beacon nodes, and determining a schedule for the placed beacon nodes to be active. This method provides location on a single plane of X,Y coordinates.

U.S. Pat. No. 9,769,601 describes using peer devices to locate a mobile device. A method is described for automatically determining location of a querying mobile device, where the querying mobile device and several mobile devices operate in a communication network. The method includes electronically receiving, via a communication network, a request from the querying mobile device to determine a location of the querying mobile device. The method also includes automatically identifying, from among the mobile devices, one or more participating mobile devices that potentially are physically proximate to the querying mobile device, where the participating mobile devices are configured to participate in determining location of the querying mobile device. The method further includes electronically transmitting, to the one or more participating mobile devices via the communication network, a request to scan for a location broadcast message transmitted by the querying mobile device, electronically receiving one or more location broadcast reports from the one or more participating mobile devices, where each received location broadcast report is indicative of the location broadcast message received at a corresponding participating mobile device, and automatically estimating the location of the querying mobile device based on (i) the received one or more location broadcast reports and (ii) respective locations of the participating mobile devices from which the one or more location broadcast reports were received.

U.S. Pat. No. 9,538,499 describes using a network location based system to send instructions/commands to the mobile devices to cause the mobile devices to group with one another. The mobile device may pair/group with another mobile device and/or establish communication links so that the mobile devices may share real-time relative location information with each other.

It is desirable to provide a method and system for improved detailed location information of a mobile device using enhanced features of the mobile device in three (3) dimensions, all while preserving anonymity capability for all devices involved.

SUMMARY OF THE INVENTION

The present invention relates to a system and method for location of a mobile device in which the mobile device is enhanced with an emulation of a wireless communications beacon, in addition to global positioning system (GPS) location capabilities. The emulation of the wireless communications beacon can be referred to as a virtual beacon. In one embodiment, the virtual beacon can be a software emulation of a Bluetooth, or other wireless communication standards such as NFC, WiFi, 3G, LTE, and the like, beacon. The virtual beacon can be used for sending and receiving communications to and from other mobile devices. The mobile device can include a transmitter antenna for transmitting and/or receiving communications to and from other mobile devices.

In the method, a general location of the mobile device is first determined, for example based on a GPS location. An example general location can be within a margin of error of a 30 foot radius from the mobile device. To pinpoint the location of the mobile device within the general location, a plurality of devices within a wireless communication range of the mobile device ping each other. For example, the wireless communication can be Bluetooth and the wireless communication range is the Bluetooth wireless communication range. The ping is used to determine mobile devices by having the mobile device act as both a virtual beacon and a transmitter to reach virtual beacons of other mobile devices. The virtual beacon would not have directional information from a communication it receives from a mobile device as the mobile device is using the mobile device's single transmitter antenna. The plurality of mobile devices determined within the wireless communication range can send information to one another in order to supply the relative distance to any mobile device that responded to the virtual beacon ping of the mobile device and a mobile device identification or alias. The relative distance between the devices can be calculated by Distance D=speed×time, where speed is the constant of the wireless communication medium used and time is ½ of the time from a ping sent from a first device to an acknowledgment received at the first device, The information received at each mobile device can be provided from each mobile device to a server. In one embodiment, the server is in the Cloud. At the server, triangulation, quadrilateration, n-lateration and the like can be performed using four or more mobile devices which provide information about themselves and the three or more other mobile devices.

3-Dimensional location information may be useful for providing and/or implementing a variety of location-based services, including emergency location services, commercial location services, internal location services, phone location, traffic flow including motorized and pedestrian and lawful intercept location services. Emergency location services may include services relating to the provision of location and/or identification information to emergency service personal and/or emergency systems (e.g., to 911 system); commercial location services may include any general or value-added service (e.g., asset tracking services, navigation services, location-based advertising services, etc); internal location services may include services pertaining to the management of the wireless service provider network (e.g., radio resource management services, message delivery services, paging services, call delivery services, services for providing position/location network enhancements, etc.); and lawful intercept location services may include any service that provides public safety and/or law enforcement agencies with identification and/or location information pertaining to a mobile device or a mobile device user.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
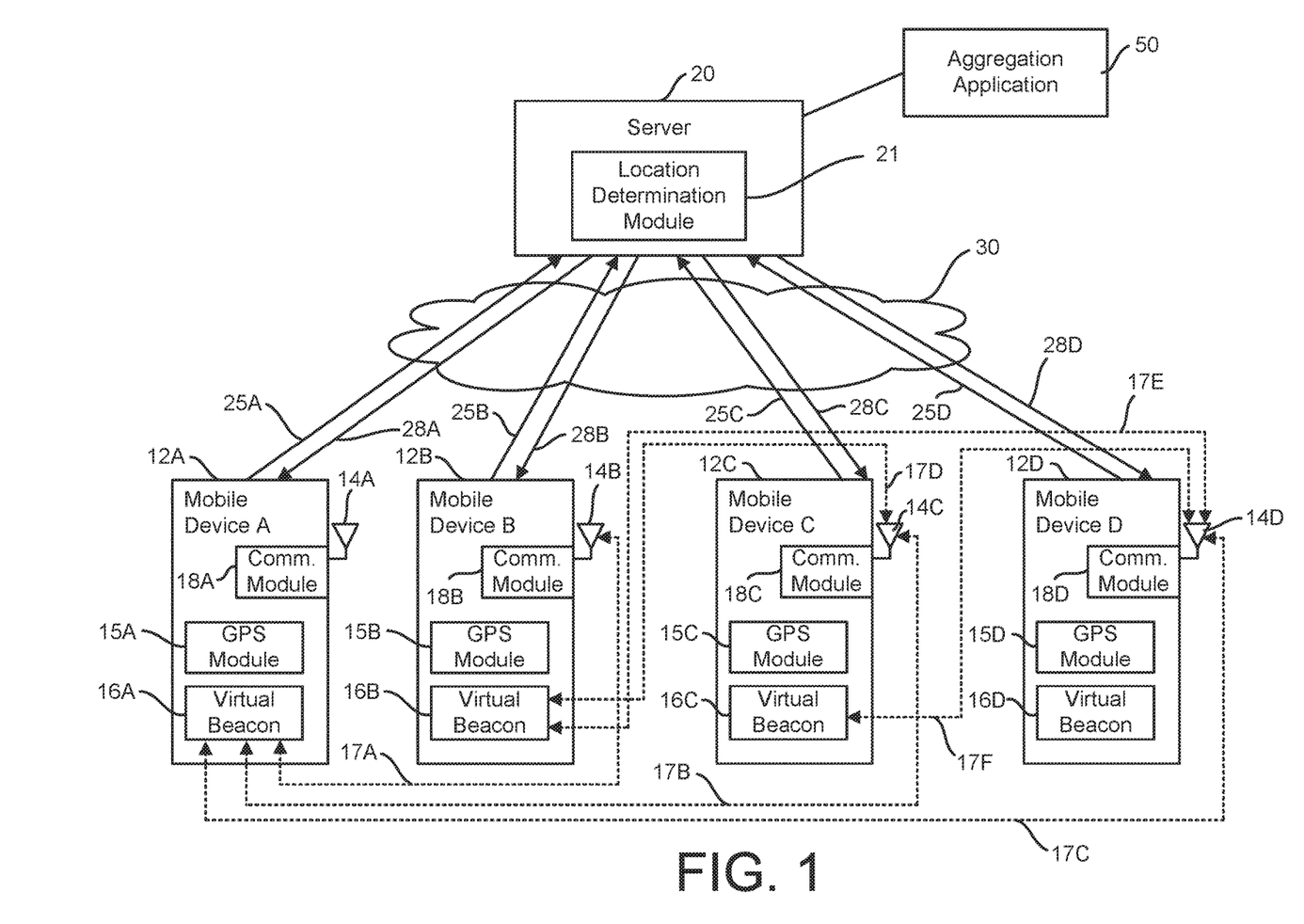
FIG. 1 is a schematic diagram of an example system for determining location of a mobile device in accordance with the teachings of the present invention.

FIG. 1 is a schematic diagram of system for location of a mobile device 10 in accordance with the teachings of the present invention. Each of mobile devices 12A-12D include respective antenna 14A-14D. Suitable mobile devices 12A-12D include cellular phones, smartphones, Bluetooth or other wireless beacons, tablet or personal computers. Each of mobile devices 12A-12D can include a respective global positioning system (GPS) location module 15A-15D. In one embodiment, GPS location module 15 is implemented by a GPS chip. In one embodiment, mobile devices 12A-12D can include an altimeter to provide altitude information to server 20.

Each of mobile devices 12A-12D can implement a respective virtual beacon 16A-16D. Virtual beacon 16 can be a module of a software emulation of a wireless communications beacon to provide a virtual beacon. In one embodiment, virtual beacon 16 acts as a virtual Bluetooth beacon. Alternatively, virtual beacon 16 is a beacon of a wireless communication standard including NFC, WiFi, 3G, LTE and the like. A respective communication link 17A-17F can be established between respective virtual beacons 16A-16D and antennas 14A-14D. Communications modules 18A-18D receive communications from antennas 14A-14D. For example, communications modules 18A-18D can include a respective wireless communications protocol for example Bluetooth, NFC, WiFi, 3G, LTE and the like to correspond to the type of virtual beacon 16, for example Bluetooth, NFC, WiFi, 3G, LTE and the like. Mobile devices 12A-12D communicate to server 20 over wireless network 30. Sever 20 can implement location determination module 21.

In one embodiment server 20 can be implemented in the cloud with cloud computing. According to various embodiments, each of the modules illustrated in system 10 (e.g., the GPS location modules 15A-15D, the virtual beacon modules 16A-16D and location determination module 21, etc.) is implemented in hardware, in a processor that executes firmware and/or software instructions, or a combination thereof. Wireless network 30 can be the internet, LTE, 4G, 3G, a Bluetooth communications network, or the like.

Figure 2:
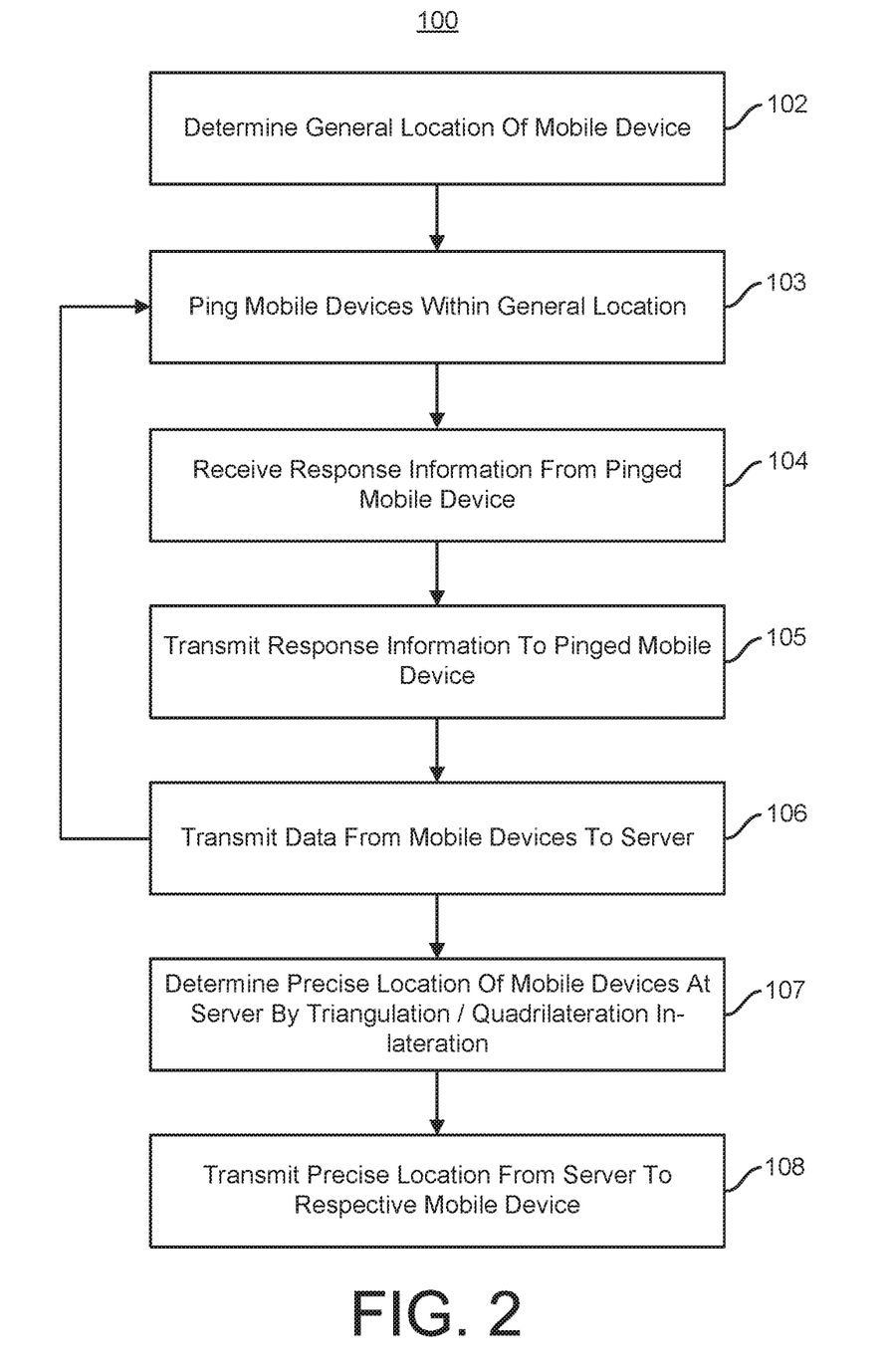
FIG. 2 is a flow diagram of an example method for system for determining location of a mobile device in accordance with the teachings of the present invention.

FIG. 2 is a flow diagram of an example method 100 for locating a mobile device that may be implemented in system 10. At block 102, a general location of mobile device 12 is determined. For example, a general location of mobile device 12A can be determined using GPS module 15A.

Figure 3A:
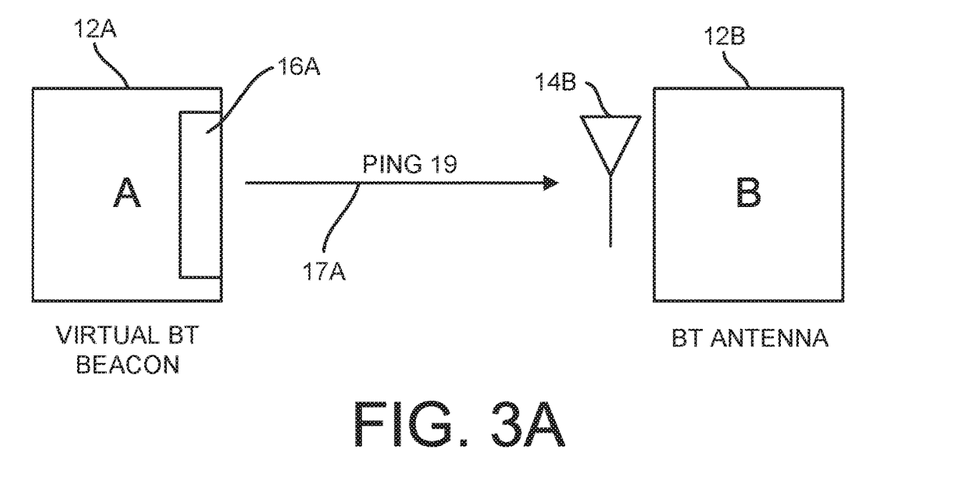
FIG. 3A is a sequence diagram corresponding to a ping of a mobile device.

At block 103, mobile device 12A pings other mobile devices 12B-12D within the determined general location of mobile device 12A. Referring to FIG. 3A, block 103 can be implemented by virtual beacon 16A sending ping 20 over communications link 17A to antenna 14B of mobile device 12B. Ping 20 is received at antenna 14B at communications module 18B.

Figure 3B:
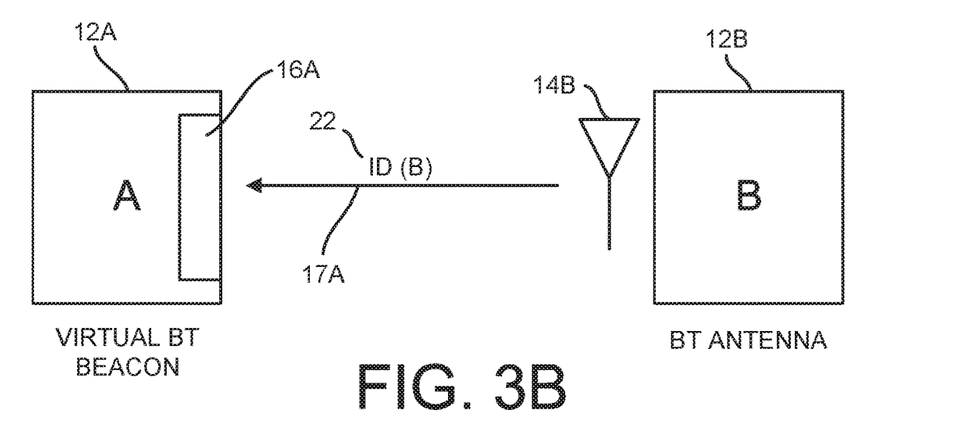
FIG. 3B is a sequence diagram corresponding to transmission of information from a pinged mobile device.
Figure 3C:
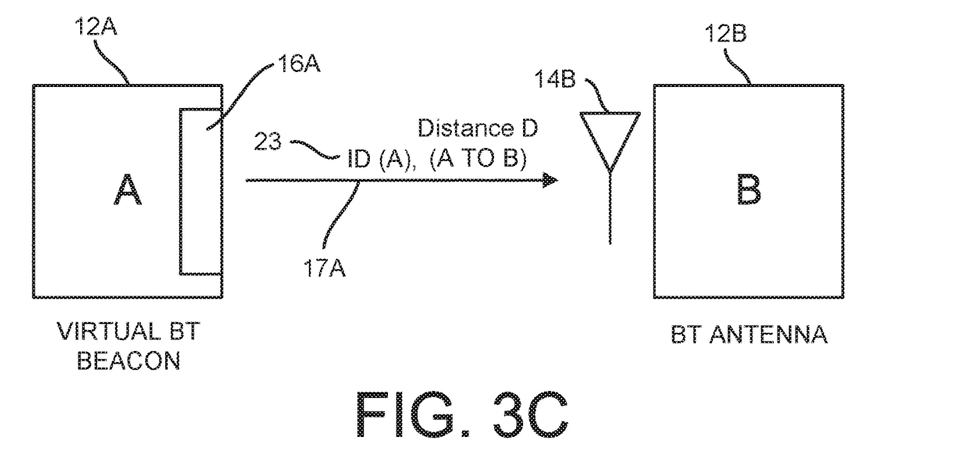
FIG. 3C is a sequence diagram corresponding to transmission of information from a mobile device.

At block 104, mobile device 12A receives information from mobile device 12B which received ping 20. Referring to FIG. 3B, block 104 can be implemented by mobile device 12B sending response information 22 over communications link 17A to virtual beacon 16A. For example response information 22 can be an identification of pinged mobile device 12B referred to as ID(B) or an alias. At block 105, mobile device 12A transmits response information 23 to mobile device 12B which received ping 20. Referring to FIG. 3C, block 105 can be implemented by mobile device 12A sending response information 23 over communications link 17A to mobile device 12B. For example, response information 23 can be an identification of mobile device 12A referred to as ID(a) or alias as well as a relative distance D between mobile device 12A and mobile device 12B calculated at mobile device 12A using a time duration between ping 20 sent from mobile device 12A and response information 22 received at mobile device 12A from 12B along with a speed of the wireless medium used for sending ping 20.

Figure 4:
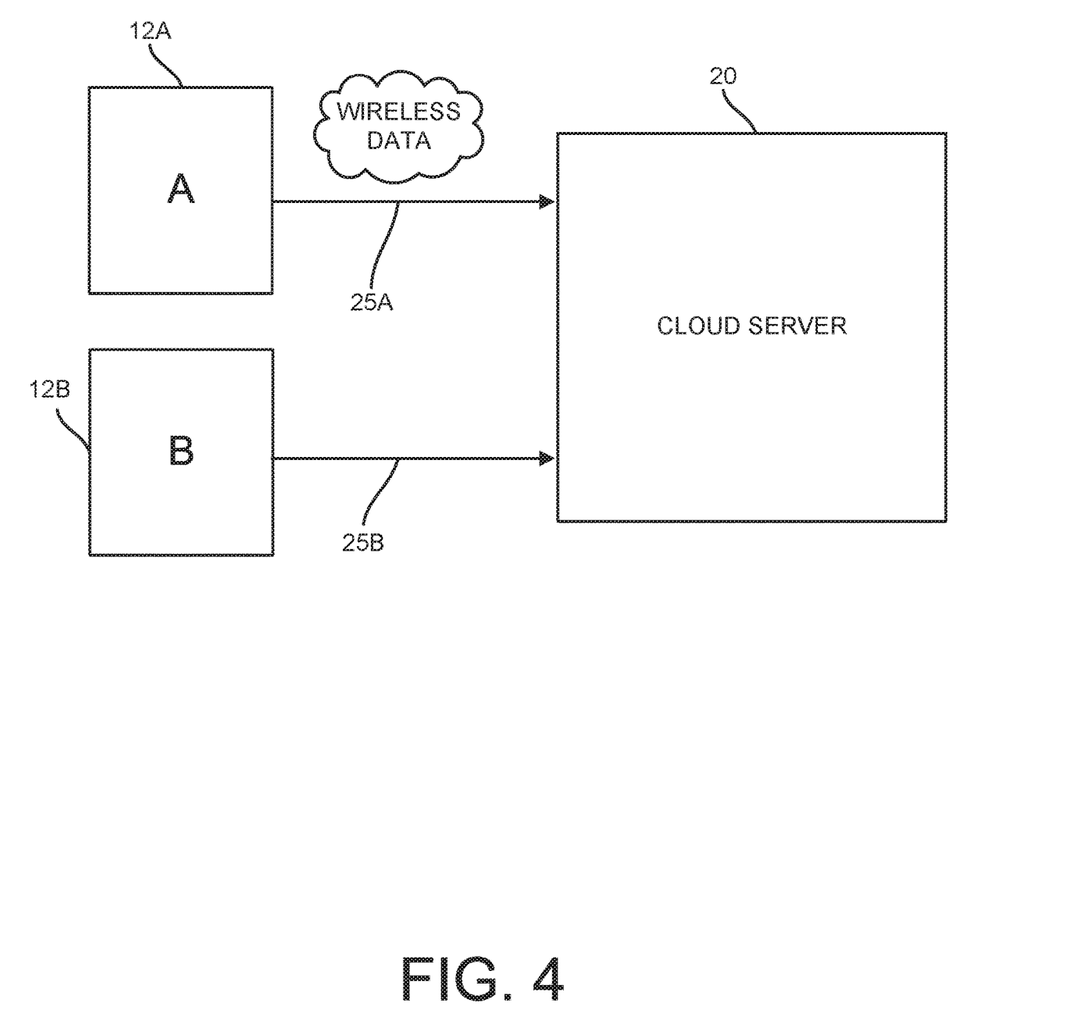
FIG. 4 is a partial schematic diagram of the system shown in FIG. 1.

At block 106, data 25 from mobile devices 12A and 12B is sent to server 20. Referring to FIG. 4, data 25A from mobile device 12A can include response information 23 of ID(B) or an alias, the relative distance from mobile device 12A to mobile device 12B, and a GPS location of mobile device 12A at the time of sending ping 20 from mobile device 12A. Referring to FIG. 1, the GPS location of mobile device 12A at the time of sending ping 20 from mobile device 12A can be determined from GPS module 15A. Data 25B from mobile device 12B can include response information 23 of ID(A) or an alias, the relative distance D from mobile device 12A to mobile device 12B which was sent from mobile device 12A to mobile device 12B in response information 23, a GPS location of mobile device 12B at the time of receiving response information 23 from mobile device 12A, and a time of receipt of response information 23 from mobile device 12A. Referring to FIG. 1, the GPS location of mobile device 12B at the time of receiving response information 23 from mobile device 12A can be determined from GPS module 15B.

Figure 5:
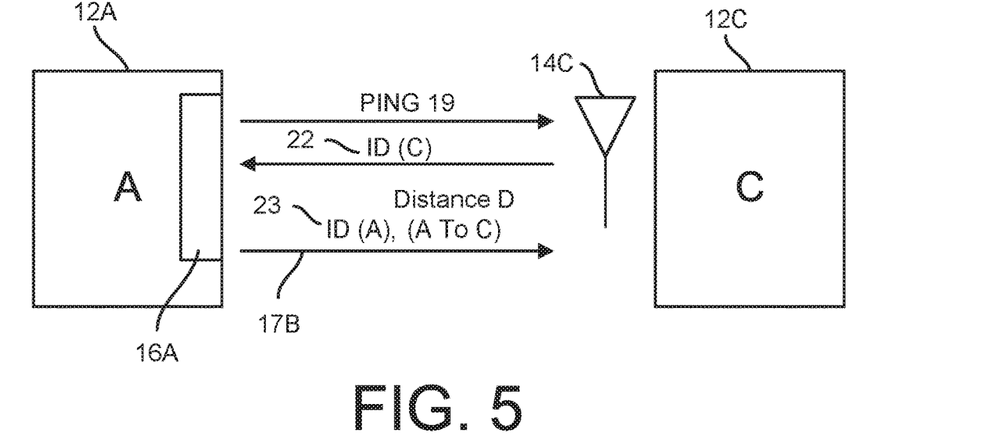
FIG. 5 is a sequence diagram corresponding to transmission between mobile devices.

Blocks 103 to 106 can be repeated to obtain additional data 25 from mobile devices 12A-12D. Referring to FIG. 5, block 103 can be implemented by virtual beacon 16A sending ping 20 over communications link 17B to antenna 14C of mobile device 12C. Ping 20 is received from antenna 14C at communications module 18C. Block 104 can be implemented by mobile device 12C sending response information 22 over communications link 17B to virtual beacon 16A. Response information 22 can be an identification of pinged mobile device 12C referred to as ID(C) or an alias. Block 105 can be implemented by mobile device 12A sending response information 23 over communications link 17B to mobile device 12C and relative distance D from 12A to 12C Response information 23 can be an identification of mobile device 12A referred to as ID(A) or an alias as well as a relative distance between mobile device 12A and mobile device 12C calculated at 12A using a time duration between ping 20 sent from mobile device 12A and response information 22 received at mobile device 12A from mobile device 12C along with a speed of the wireless medium used for sending ping 20. Data 25 from mobile devices 12A and 12C is sent to server 20. Data 25A from mobile devices 12A can include response information of 23 ID(C) or an alias, the relative distance D from mobile device 12A to mobile device 12C and a GPS location of mobile device 12A at the time of sending ping 20 from mobile device 12A Data 25C from mobile devices 12C can include response information 23 of ID(A) or an alias, the relative distance D from mobile device 12A to mobile device 12C which was sent from mobile device 12A to mobile device 12C in response information 23, a GPS location of mobile device 12C at the time of receiving response information 23 from mobile device 12A, and a time of receipt of response information 23 from mobile device 12A. Referring to FIG. 1, the GPS location of mobile device 12C at the time of receiving response information 23 from mobile device 12A can be determined from GPS module 15C.

Figure 6:
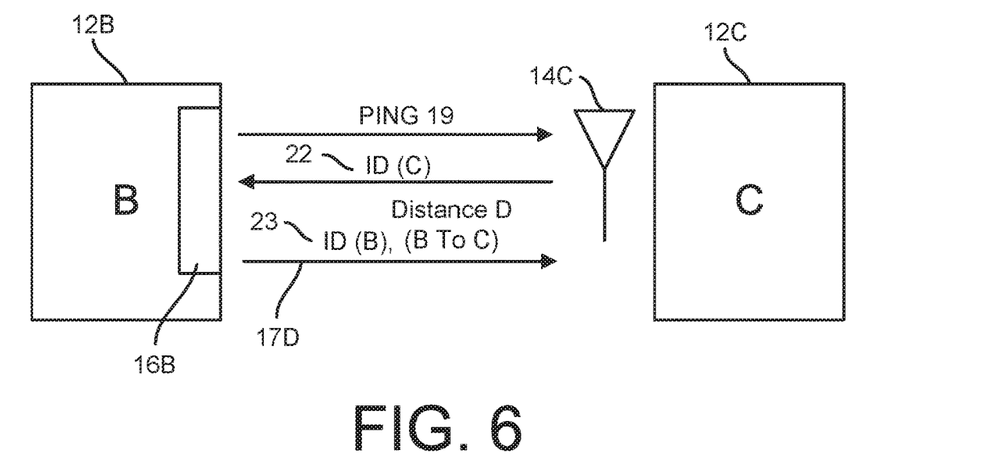
FIG. 6 is a sequence diagram corresponding to transmission between mobile devices.

Referring to FIG. 6, block 103 can be implemented by virtual beacon 16B sending ping 20 over communications link 17D to antenna 14C of mobile device 12C. Ping 20 is received from antenna 14C at communications module 18C. Block 104 can be implemented by mobile device 12C sending response information 22 over communications link 17D to virtual beacon 16B. Response information 22 can be an identification of pinged mobile device 12C referred to as ID(C) or an alias. Block 105 can be implemented by mobile device 12B sending response information 23 over communications link 17D to mobile device 12C and relative distance from 12B to 12C. Response information 23 can be an identification of mobile device 12B referred to as ID(B) or an alias as well as a relative distance D between mobile device 12B and mobile device 12C calculated at 12B using a time duration between ping 20 sent from mobile device 12B and response information 22 received at 12B from 12C along with a speed of the wireless medium used for sending ping 20. Data 25B from mobile device 12B can include identification information 23 ID(C) or an alias, the relative distance from mobile device 12B to mobile device 12C and a GPS location of mobile device 12B at the time of sending ping 20 from mobile device 12B. Data 25C from mobile devices 12C can include identification information 23 ID(B) or an alias, the relative distance from mobile device 12B to mobile device 12C which was sent from mobile device 12B to mobile device 12C in response information 23, a GPS location of mobile device 12C at the time of receiving response information 23 from mobile device 12B, and a time of receipt of response information from mobile device 12B.

Figure 7:
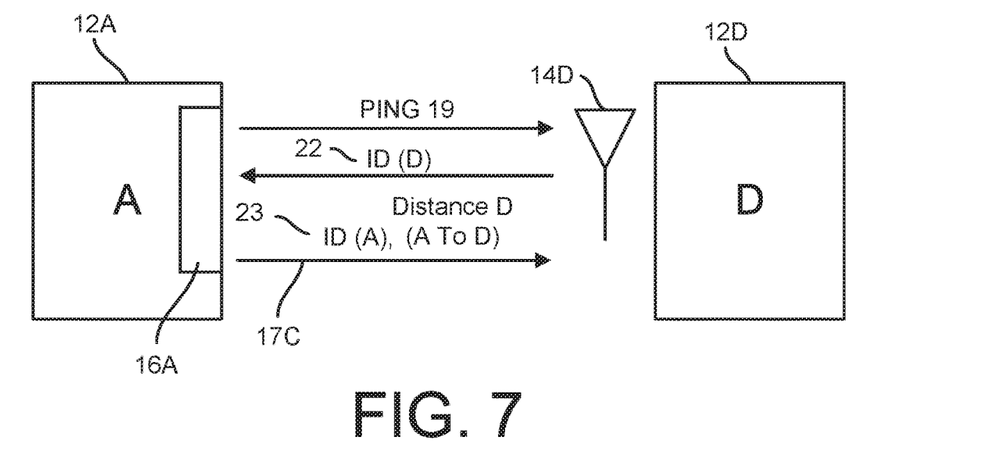
FIG. 7 is a sequence diagram corresponding to transmission between mobile devices.

Referring to FIG. 7, block 103 can be implemented by virtual beacon 16A sending ping 20 over communications link 17C to antenna 14D of mobile device 12D. Ping 20 is received from antenna 14D at communications module 18D. Block 104 can be implemented by mobile device 12D sending response information 22 over communications link 17C to virtual beacon 16A. Response information 22 can be an identification of pinged mobile device 12D referred to as ID(D) or an alias. Block 105 can be implemented by mobile device 12A sending response information 23 over communications link 17C to mobile device 12D and a relative distance from 12A to 12D. Response information 23 can be an identification of mobile device 12A referred to as ID(A) or an alias as well as a distance between mobile device 12A and mobile device 12D calculated at 12D using a time duration between ping 20 sent from mobile device 12A and response information 22 received at 12A from 12D along with a speed of the wireless medium used for sending ping 20. Data 25A from mobile devices 12A can include response information of 23 ID(D) or an alias, the distance from mobile device 12A to mobile device 12D and a GPS location of mobile device 12A at the time of sending ping 20 from mobile device 12A. Data 25D from mobile device 12D can include identification information 23 ID(A) or an alias, the relative distance from mobile device 12A to mobile device 12D which was sent from mobile device 12A to mobile device 12D in response information 23, a GPS location of mobile device 12D at the time of receiving response information 23 from mobile device 12A, and a time of receipt of response information 23 from mobile device 12A.

Figure 8:
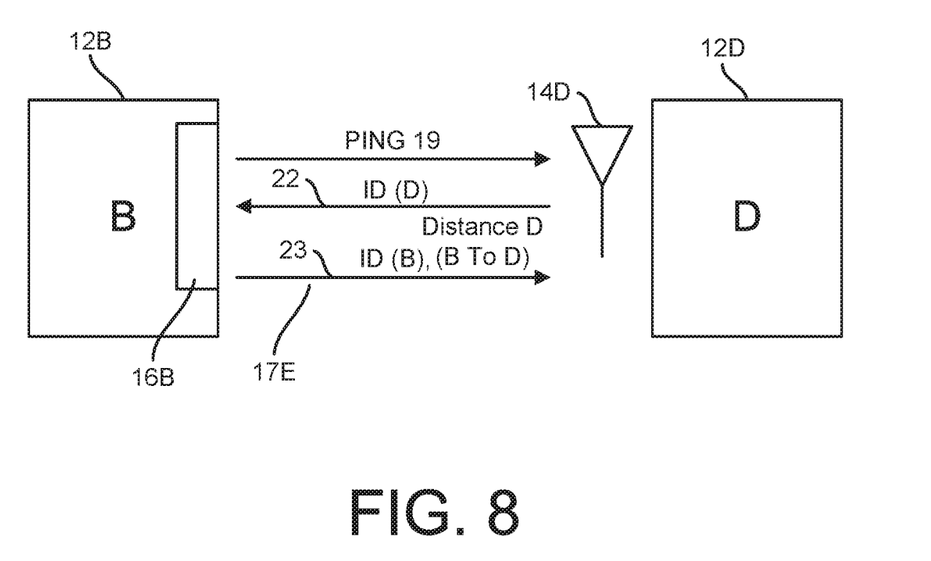
FIG. 8 is a sequence diagram corresponding to transmission between mobile devices.

Referring to FIG. 8, block 103 can be implemented by virtual beacon 16B sending ping 20 over communications link 17E to antenna 14D of mobile device 12D. Ping 20 is received from antenna 14D at communications module 18D. Block 104 can be implemented by mobile device 12D sending response information 22 over communications link 17E to virtual beacon 16B. Response information 22 can be an identification of pinged mobile device 12D referred to as ID(D) or an alias. Block 105 can be implemented by mobile device 12B sending response information 23 over communications link 17E to mobile device 12D and relative distance D from 12B to 12D. Response information 23 can be an identification of mobile device 12B referred to as ID(B) or an alias as well as a relative distance D between mobile device 12B to mobile device 12D calculated at mobile device 12B using a time duration between ping 20 sent from mobile device 12B and response information 22 received at mobile device 12B from mobile device 12D along with a speed of the wireless medium used for sending ping 20. Data 25B from mobile device 12B can include response information 23 of ID(D) or an alias, the relative distance D from mobile device 12B to mobile device 12D, and a GPS location of mobile device 12B at the time of sending ping 20 from mobile device 12B. Data 25D from mobile devices 12D can include response information 23 of ID(B) or an alias, the relative distance D from mobile device 12B to mobile device 12D which was sent from mobile device mobile device 12B to mobile device 12D in response information 23, a GPS location of mobile device 12D at the time of receiving response information 23 from mobile device 12B, and a time of receipt of response information from mobile device 12B.

Figure 9:
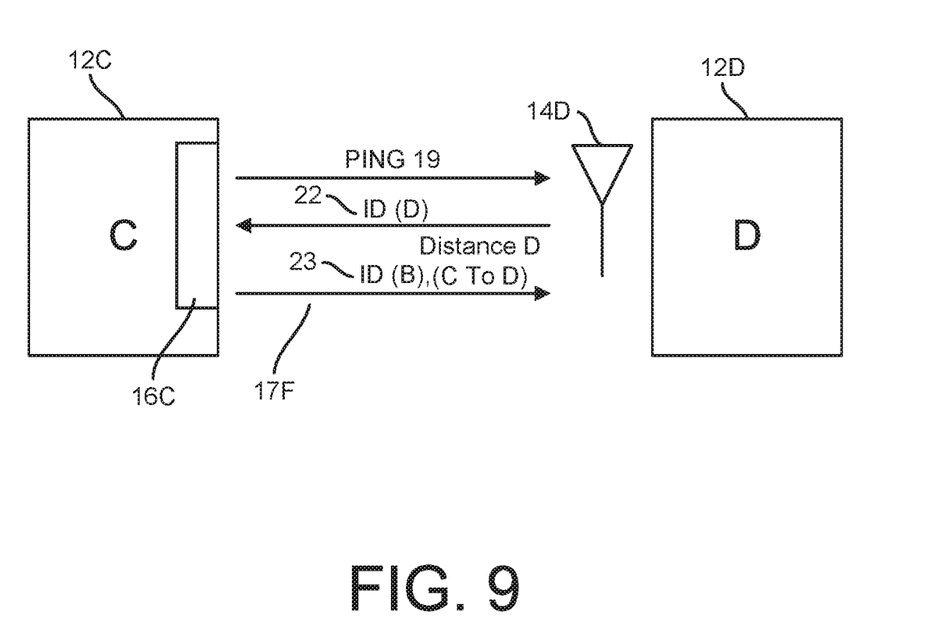
FIG. 9 is a sequence diagram corresponding to transmission between mobile devices.

Referring to FIG. 9, block 103 can be implemented by virtual beacon 16C sending ping 20 over communications link 17F to antenna 14D of mobile device 12D. Ping 20 is received from antenna 14D at communications module 18D. Block 104 can be implemented by mobile device 12C sending response information 22 over communications link 17F to virtual beacon 16C. Response information 22 can be an identification of pinged mobile device 12D referred to as ID(D) or an alias. Block 105 can be implemented by mobile device 12C sending response information 23 over communications link 17F to mobile device 12C and relative distance D from 12C to 12D Response information 23 can be an identification of mobile device 12C referred to as ID(C) or an alias as well as a relative distance D between mobile device 12C to mobile device 12D calculated at mobile device 12C using a time duration between ping 20 sent from mobile device 12C and response information 22 received at mobile device 12C from mobile device 12D along with a speed of the wireless medium used for sending ping 20. Data 25C from mobile device 12C can include identification information 23 ID(D) or an alias, the relative distance from mobile device 12C to mobile device 12D and a GPS location of mobile device 12C at the time of sending ping 20 from mobile device 12C. Data 25D from mobile devices 12D can include identification information 23 ID(C), relative distance from mobile device 12C to mobile device 12D which was sent from mobile device 12C to mobile device 12D in response information 23, a GPS location of mobile device 12D at the time of receiving response information 23 from mobile device 12C, and a time of receipt of response information 23 from mobile device 12C.

Referring to FIG. 2, at block 107 precise location information 28A-28D can be determined for mobile devices 12A-12D from respective data 25A-25D received at server 20. In one embodiment, triangulation/quadrilateration/etc. of data 25A-25D is used to determine precise location information 28A-28D.

Figure 10:
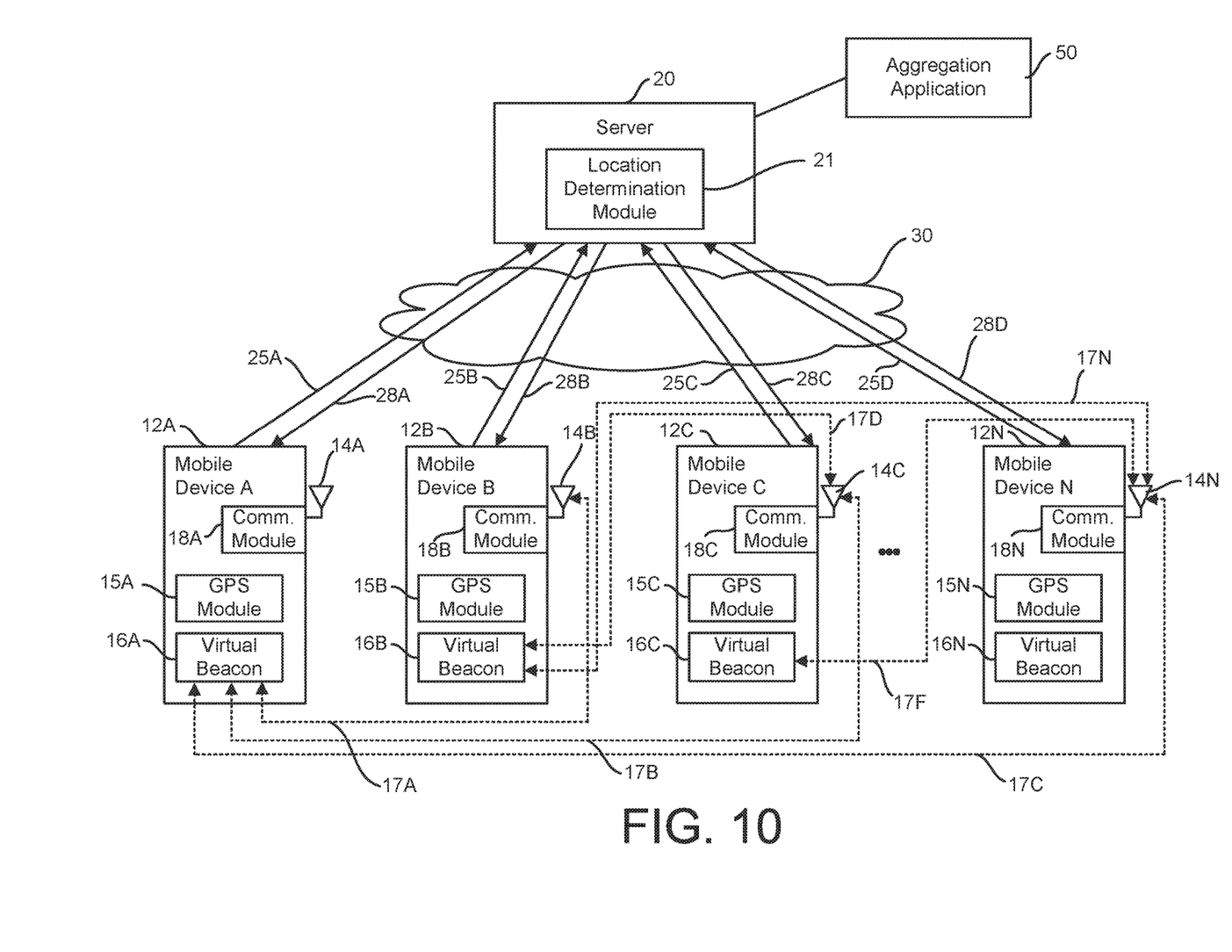
FIG. 10 is a schematic diagram of the example system for determining location of a mobile device in accordance with the teachings of the present invention.
Figure 11:
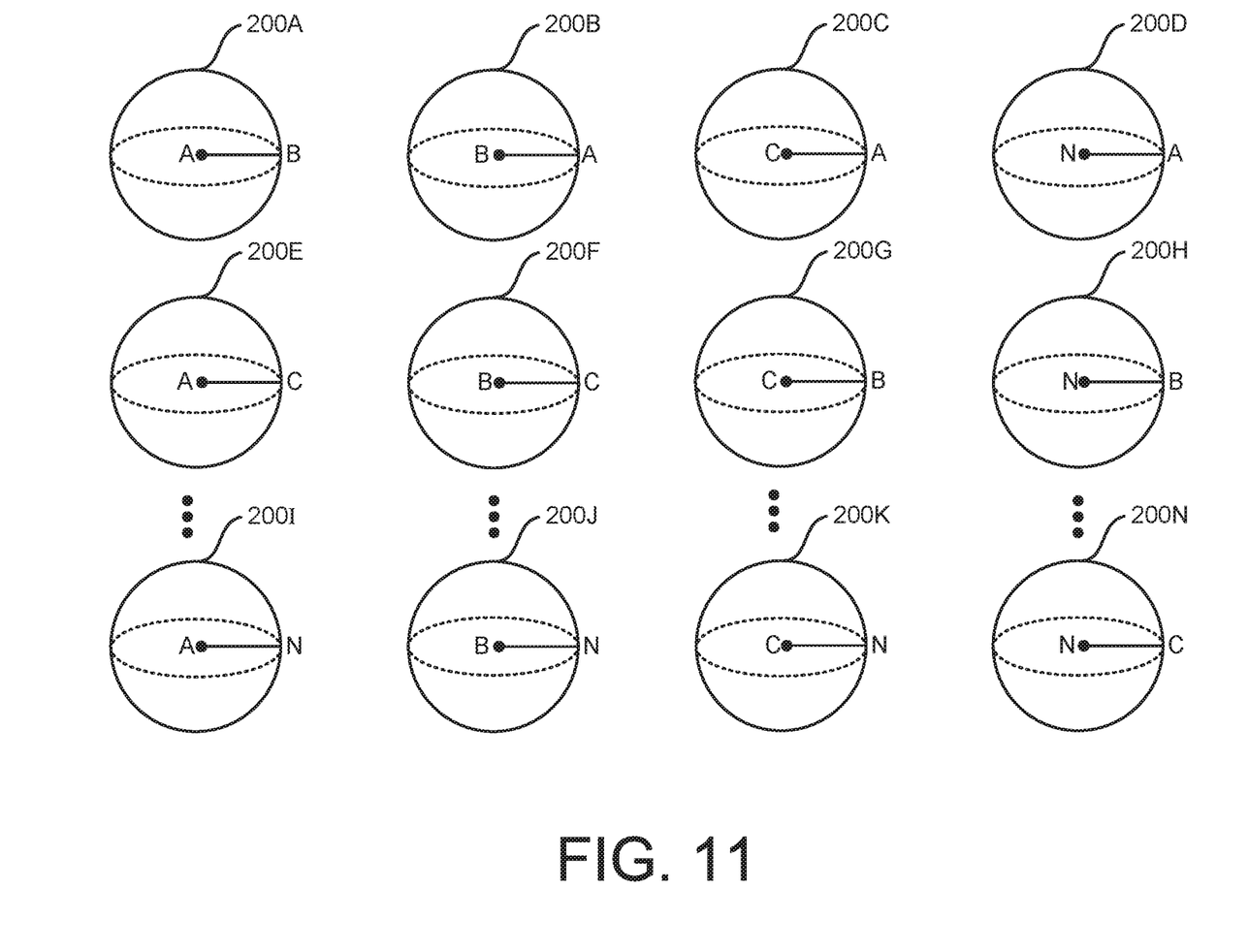
FIG. 11 is a schematic diagram of an implementation of a 3D convergence for determining location of a mobile device in accordance with the teachings of the present invention.

In one embodiment, referring to FIG. 2 and FIG. 10, block 103 can be implemented as a broadcast of ping from mobile device 12A to a plurality of mobile devices 12B-12N within the general location determined in block 102. The relative distance and alias information provided allows server 20 to create a spheres 200 with the broadcast mobile device 12 at the center using the general location determined in block 102 with a radius equal to the relative distance transmitted in data 25 relative to the ping broadcast mobile device 12 and the acknowledgment pinged mobile device 12. As the total data 25A-25D is received from mobile devices 12A-12N and spheres 200A-200N are logically created, server 20 can precisely determine location of each mobile device 12 by finding a sphere convergence. Data from topographical maps such as elevation along with logic of density of mobile devices 12 on a single plane and size of that plane and altimeter information if available can allow server 20 to estimate a ground level and which mobile devices 12 are present on the level on the z axis to determine a precise 3-dimensional location. Sphere convergence relative to the determined ground level can provide altitude/z-axis information using n-lateration. At block 108, precise 3-dimensional location information 28A-28N can be transmitted from server 20 respectively to mobile devices 12A-12N as shown in FIG. 10. In one embodiment, the precise 3-dimensional location information is forwarded to the respective mobile device 12A-12N and one or more aggregation applications 50 can have access to the precise 3-Dimensional location of one or more of mobile devices 12A-12N. Examples of aggregation applications 50 can include using the precise 3-dimensional location information in law enforcement applications.

Embodiments of the present invention may be implemented in connection with a special purpose or general purpose telecommunications device that include both hardware and/or software components, including wireless telephones and other telephony-enabled wireless devices such as smart watches, landline telephones, or special purpose or general purpose computers that are adapted to have telecommunications capabilities.

Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," or "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for 3-Dimensional location of a mobile device comprising steps of;
   a. determining a general location of a first mobile device;
   b. pinging another mobile devices within the general location;
   c. receiving response information from the another mobile devices at the first mobile device, the response information including an identification or alias of the another mobile devices;
   d. transmitting information from the first mobile device and the another mobile devices to a central system, the information including a relative distance between the first mobile device and the another mobile devices and relative distances between at least two of the another mobile devices and a GPS location of the pinging device at a time of the ping;
   e. determining at the central system a 3-Dimensional location information of the first mobile device and the at least two of the another mobile devices by triangulation, qaudrilateration, or n-lateration, of the information received from each of the at least two of the another mobile devices; and
   f. providing the 3-Dimensional location information from the central system to a respective another mobile devices and the first mobile device.

2. The method of claim 1 wherein the general location is determined by a global positioning system.

3. The method of claim 1 wherein in the step b. the mobile device pings the another mobile device using a virtual beacon.

4. The method of claim 3 wherein the virtual beacon is an emulation of a Bluetooth beacon, or other wireless protocol beacon.

5. The method of claim 1 wherein the information received in the step c. is an identification of each of the another mobile devices.

6. The method of claim 1 further comprising a step of:
   g. providing the 3-Dimensional location information from remote devices to one or more applications.

7. The method of claim 1 wherein one or more aggregation applications have access to the 3-Dimensional location information of the another mobile devices.

8. A system for location of a mobile device comprising a plurality of mobile devices, each of the mobile devices including a respective virtual beacon and a GPS module, a wireless network connecting the plurality of mobile devices to a central system, wherein a one or more of the mobile devices ping one or more of other of the mobile devices within a general location using the respective virtual beacon and receives response information from the pinged other mobile devices, information of the respective mobile device sending the ping and the response information from the pinged one or more of the other mobile devices, is used to determine a 3-dimensional location location of the mobile device, wherein the 3-dimensional location location is determined by triangulation, qaudrilateration, or n-lateration,     wherein the information of the mobile device and the pinged other mobile devices include a relative distance between the mobile device and a respective one of the pinged mobile devices, a GPS location of the mobile device and the respective one of the pinged mobile devices at a time of the sending of the response information and a time of the ping and wherein the central system provides the 3-dimensional location to the respective other mobile devices.

9. The system of claim 8 wherein the general location is determined by a global positioning system.

10. The system of claim 8 wherein the central system is a server including cloud computing.

11. The system of claim 8 wherein the virtual beacon is an emulation of a Bluetooth, or similar wireless protocol beacon.

12. The system of claim 8 wherein one or more aggregation applications have access to the 3-Dimensional locations of the other mobile devices.

* * * * *